US008155159B2

(12) United States Patent
Bowler et al.

(10) Patent No.: US 8,155,159 B2
(45) Date of Patent: Apr. 10, 2012

(54) METHOD AND APPARATUS FOR CALIBRATING BURST MODE LASER TRANSMITTERS

(75) Inventors: David Bowler, Acton, MA (US); Jim Aufiero, Reading, MA (US); Frank Calabresi, Harvard, MA (US); Christopher Pekalsky, Raymond, NH (US); Jason G. Luk, Woburn, MA (US)

(73) Assignee: General Instruments Corporation, Horsham, PA (US)

( * ) Notice: Subject to any disclaimer, the term of this patent is extended or adjusted under 35 U.S.C. 154(b) by 935 days.

(21) Appl. No.: 12/138,600

(22) Filed: Jun. 13, 2008

(65) Prior Publication Data

US 2009/0310961 A1 Dec. 17, 2009

(51) Int. Cl.
*H01S 3/30* (2006.01)
*H01S 3/13* (2006.01)
*H01S 3/00* (2006.01)

(52) U.S. Cl. .................... 372/29.02; 372/8; 372/29.021; 372/38.01

(58) Field of Classification Search ............... 372/8, 25, 372/26, 29.01, 29.011, 29.02, 29.021, 30, 372/38.01
See application file for complete search history.

(56) References Cited

U.S. PATENT DOCUMENTS

| 6,738,401 B2 | 5/2004 | Bowler et al. |
| 6,937,949 B1 | 8/2005 | Fishman et al. |
| 7,120,179 B2 | 10/2006 | Fennelly et al. |
| 2005/0265717 A1 | 12/2005 | Zhou |

*Primary Examiner* — Armando Rodriguez

(57) ABSTRACT

A method is provided to calibrate a monitor photodiode that measures the optical output power generated by an optoelectronic transceiver module that includes a burst mode laser diode. The method includes disabling the power control loop that controls an average optical output power generated by the laser diode during a laser burst. A series of logic zero signals is applied to a data input of the transceiver module and the logic zero level of the optical signal generated by the burst mode laser diode while applying the series of logic zero signals is measured. The logic zero bias level applied to the laser diode is adjusted until the measured logic zero level of the optical signal reaches a first desired value. While maintaining the optical signal at the first desired value, a first value of a current generated by the monitor photodiode in response to optical energy received from a back facet of the laser diode is stored. The first value of the current represents the calibrated value of the monitor current that will be measured when the laser generates a proper logic zero optical signal.

12 Claims, 3 Drawing Sheets

METHOD AND APPARATUS FOR CALIBRATING BURST MODE LASER TRANSMITTERS

FIELD OF THE INVENTION

The present invention relates generally to burst mode laser diodes employed in communications networks such as passive optical networks (PONs), and more particularly to the calibration of the monitoring photodiode used in the power control circuit that controls the optical output power generated by the burst mode laser diodes.

BACKGROUND OF THE INVENTION

Laser diodes are typically used to transmit data information over fiber optic networks. To achieve higher speed data rates, a laser diode can be biased with a drive current so it is 'ON' and produces at least a minimal optical output. While the diode is biased, the diode can be driven with additional current so that the light output of the diode varies over time between two power output levels. One power output level of the diode can represent a logic low or zero while another power output level of the diode can represent a logic high or one. The optical extinction ratio is the term applied to the relationship in dB between the logic one optical power level and the logic zero optical power level.

Laser diodes are typically supplied to system integrators (e.g., communication network developers) as part of a single transmitter or transceiver module that includes not only the laser diode, but also a laser driver and a controller. In the case of a transceiver, the module will also typically include a receiver photodiode and a receiver circuit that includes an amplifier. Such modules are usually supplied with standard input and output pins to connect to external circuitry. These modules were generally first designed for use with continuous mode lasers, which have been in widespread use for many years in optical communications systems that employ SONET and SDH protocols, for instance. Recently, however, burst mode lasers have come to be used in optical communication systems such as Passive Optical Networks, for example.

A burst mode laser, in contrast to a continuous mode laser, produces output only during selected intervals. It will be appreciated that the burst-mode transmitter is essentially turned off and does not transmit an optical signal until a burst-mode incoming signal is received. Only upon receiving the incoming signal will the burst-mode transmitter operate in comparison to the constant transmission of optical signals at the output of continuous mode transmitters. This manner of biasing a burst mode laser is illustrated in FIG. 1, which shows the optical power generated by the burst mode laser as a function of its bias current as well as an optical signal consisting of a series of logic ones and zeros. A first bias current is applied to the burst mode laser to achieve a logic zero level. Likewise, a second or modulation bias current is applied to the burst mode laser to achieve a logic one level. At all other times the laser is off and no bias is applied.

It will be appreciated that the incoming signals used to bias the burst mode laser can be of various lengths of data, where some signals can be as short as 10 microseconds, for instance, in the case of a DOCSIS burst signal. In a Gigabit PON (GPON) network, the minimum burst time is 32 ns including the preamble, delimiter and data. The minimum amount of data per burst is 1 byte (6.4 ns).

To compensate for temperature fluctuations and aging, many laser driver control circuits employ an analog control loop to maintain a constant average output power from the laser. A power monitor photodiode senses the output power of the laser for feedback to the driver control circuit. In particular, the power monitor photodiode typically receives a portion of the output power from the back facet of the laser and generates a current that is proportional to the output power from the front facet of the laser. The front facet of the laser is aligned with the fiber core to create a signal output path.

Similar to continuous mode laser diodes, burst mode laser diodes are also generally supplied to system integrators as part of a single transmitter or transceiver module in which additional components such as those mentioned above are integrated onto a single board. For convenience, burst mode laser diodes have often been retrofitted into modules that were originally configured for continuous mode laser diodes, with the same operational states, the same input and output pin arrangements, and the like.

It is well known that the operating characteristics of laser diodes used in each transceiver or transmitter module typically varies from module to module within a given product line. This variation prevents the utilization of global bias settings throughout an entire product line whose components and configurations are otherwise identical. Therefore, the logic zero and one bias levels for each module must be calibrated and set individually to achieve optical levels of operation. These optimal levels correspond to operations where the extinction ratio and optical output power remain at desired values. Calibrating and setting the logic zero and one bias levels of each individual laser diode for each transceiver is both expensive and time consuming.

The logic zero and one bias levels of a laser diode are normally established using a test system that contains a digital communication analyzer ("DCA"). The DCA is used to monitor an optical output signal having a random pattern of data while varying the logic zero and one bias levels of an optical transmitter module until the bias levels are found that produces the optimal extinction ratio in the optical output signal is found. At the same time the monitor photodiode is also calibrated by recording the average current generated by the monitor photodiode for both the logic zero and logic one levels corresponding to the desired extinction ratio. Accordingly, in operation, the desired extinction ratio and its corresponding optical logic zero and logic one levels can be achieved by adjusting the bias levels as necessary to maintain the current generated by the photodiode at the levels that have been recorded during the calibration process.

The DCA is essentially a specialized oscilloscope with built-in software for measuring the extinction ratio and eye mask of the laser diode. A significant disadvantage to using the DCA to set the logic zero and one bias levels is the cost of the DCA itself and the time and costs associated with the configuration of the software and parameter settings of the test system. Despite these disadvantages, DCAs are commonly used for continuous mode laser diodes, where extinction ratios in the range of about 10 dB are often required.

The use of a DCA to establish the bias levels of a burst mode laser diode and to calibrate the monitor photodiode in the laser driver circuit is particularly problematic. Burst mode lasers typically need to operate with much higher extinction ratios than continuous mode lasers. For instance, ITU specifications call for extinction ratios of 10 dB or higher and in many circumstances extinction ratios in the range of 20-30 dB are needed. Unfortunately, the measurement accuracy of a DCA is only about 15 dB for a signal with an average power greater than 0 dBm, making it unsuitable for use in establishing the bias levels of many burst mode laser diodes, particularly when its relatively high cost in both time and money is taken into account.

SUMMARY OF THE INVENTION

In accordance with one aspect of the invention, a method is provided to calibrate a monitor photodiode that measures the optical output power generated by an optoelectronic transceiver module that includes a burst mode laser diode. The method includes disabling the power control loop that controls an average optical output power generated by the laser diode during a laser burst. A series of logic zero signals is applied to a data input of the transceiver module and the logic zero level of the optical signal generated by the burst mode laser diode while applying the series of logic zero signals is measured. The logic zero bias level applied to the laser diode is adjusted until the measured logic zero level of the optical signal reaches a first desired value. While maintaining the optical signal at the first desired value, a first value of a current generated by the monitor photodiode in response to optical energy received from a back facet of the laser diode is stored. The first value of the current represents the calibrated value of the monitor current that will be measured when the laser generates a proper logic zero optical signal.

In accordance with another aspect of the invention, a series of logic one signals is applied to the data input of the transceiver module while the power control loop is disabled. A logic one level of the optical signal generated by the burst mode laser diode is measured while applying the series of logic one signals. A logic one bias level applied to the laser diode is adjusted until the measured logic one level of the optical signal reaches a second desired value. While maintaining the optical signal at the second desired value, a second value of the current generated by the monitor photodiode is stored in response to the optical energy received from the back facet of the laser diode. The second value of the current represents the calibrated value of the monitor current that will be measured when the laser generates a proper logic one optical signal.

DETAILED DESCRIPTION

As detailed below, the logic zero and one bias levels of a laser diode incorporated in a transmitter or transceiver module are determined without using a digital communication analyzer (DCA). Instead, a simple digital power meter is used to measure the optical output signal from the laser diode while logic one and zero signals are applied to the data input port. The logic zero and logic one bias levels applied to the laser diode are adjusted until the measured logic zero level of the optical signal reaches a first desired value. While the logic zero and one bias levels are being adjusted, the power control loop that controls the average optical output power generated by the laser diode during a laser burst is disabled. In this way the monitoring photodiode employed in the power control loop can be calibrated. The calibration process is performed by measuring and storing in memory the values of the current generated by the monitor photodiode while the burst mode laser diode is outputting the desired logic one optical signal and while it is outputting the desired logic zero optical signal. The calibrated values of the photodiode current can be subsequently used by the power control loop to maintain optical signals from the laser diode at their desired logic zero and logic one values.

Figure 1:
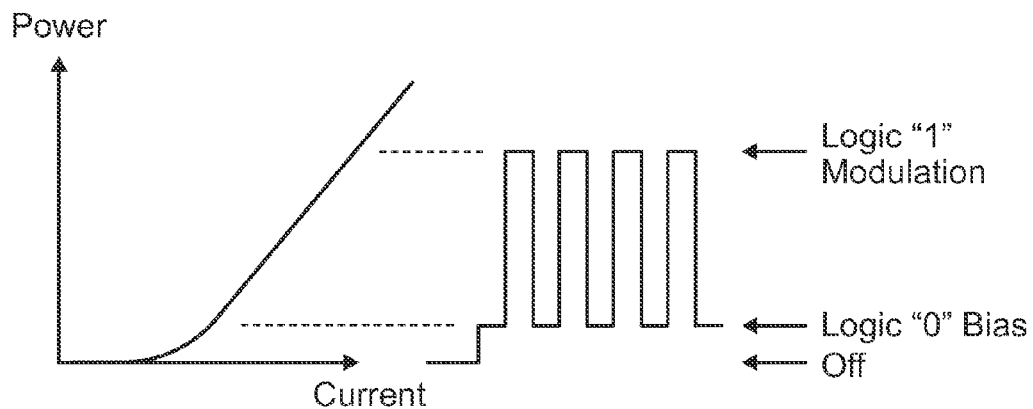
FIG. 1 shows the optical power generated by a burst mode laser diode as a function of its bias current as well as an optical signal consisting of a series of logic ones and zeros.
Figure 2:
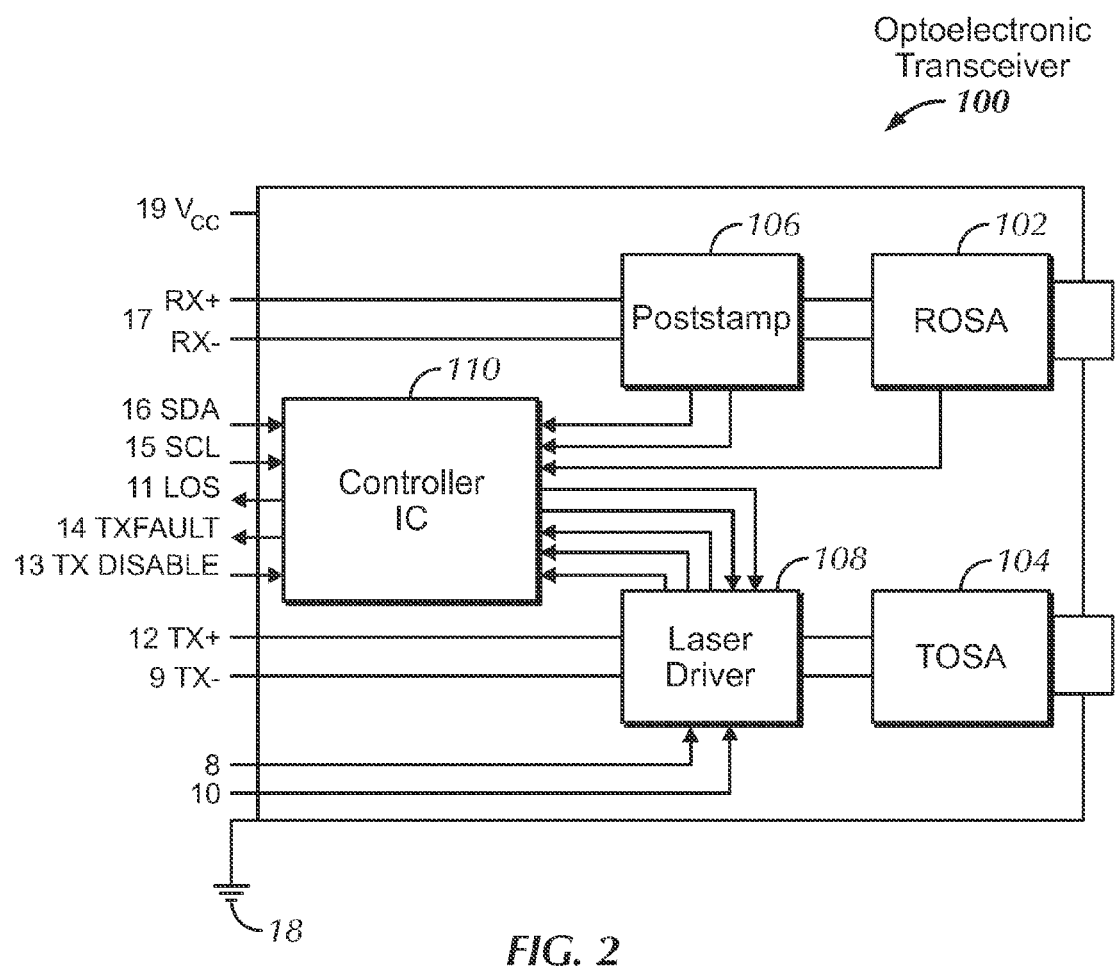
FIG. 2 shows one example of an optoelectronic transceiver module that includes a burst mode laser diode

FIG. 2 shows one example of an optoelectronic transceiver module 100 that includes a burst mode laser diode, which may be calibrated in accordance with the methods, techniques and systems described herein. While for completeness a transceiver module is depicted, those of ordinary skill in the art will recognize that the methods, techniques and systems described herein are equally suitable to an optoelectronic transmitter module that omits the receiver components.

The transceiver module 100 contains a receiver circuit, a transmitter circuit, and power supply voltage 19 and ground connections 18. The receiver circuit of the transceiver includes a Receiver Optical Subassembly (ROSA) 102, which may contain a mechanical fiber receptacle as well as a photodiode and pre-amplifier (preamp) circuit. The ROSA 102 is in turn connected to a post-amplifier (poststamp) integrated circuit 106, the function of which is to generate a fixed output swing digital signal which is connected to outside circuitry via the RX+ and RX− pins 17. The poststamp circuit 106 also often provides a digital output signal known as Signal Detect or Loss of Signal indicating the presence or absence of a suitably strong optical input.

The transmit circuit of the transceiver module 100 includes a Transmitter Optical Subassembly (TOSA) 104 and a laser driver integrated circuit 108. The TOSA 104 contains a burst mode laser diode and may also include a mechanical fiber receptacle. As an alternative to mechanical fiber receptacles, some transceivers use fiber optic pigtails, which are standard, male fiber optic connectors. The laser driver circuit 108 provides logic zero and one bias currents to the laser diode in the TOSA 104. The logic zero and one signal inputs for the laser driver 108 are obtained from the TX+ and TX− pins 12 and 9, respectively.

In addition to the basic functions described above, some transceiver platform standards involve additional functionality. Examples of this are the TX disable 13 and TX fault 14 pins described, for instance, in the GBIC interface standard, as well as other optoelectronic transceiver standards. In these transceiver standards, the TX disable pin allows the transmitter to be shut off by the host device, while the TX fault pin is an indicator to the host device of some fault condition existing in the laser or associated laser driver circuit. In addition, these standards define how these controls function and interact with each other to implement reset operations and other actions. Some of this functionality is aimed at preventing sight-damaging light emission levels when a fault conditions exists in the laser circuit. These functions may be integrated into the laser driver circuit itself or into the controller 110. Finally, many of the optoelectronic transceiver standards also require that a memory device in the transceiver 100 store standardized serial ID information that can be read out via a serial interface having a clock line (SCL) 15 and a data line (SDA) 16.

Control and setup functions of the transceiver 100 are implemented with the controller 110, which in some cases may be implemented as a single-chip integrated circuit. The controller 110 also handles all low speed communications with a host device. These include the standardized pin functions such as Loss of Signal (LOS) 11, Transmitter Fault Indication (TX FAULT) 14, and the Transmitter Disable Input (TXDIS) 13.

Figure 3:
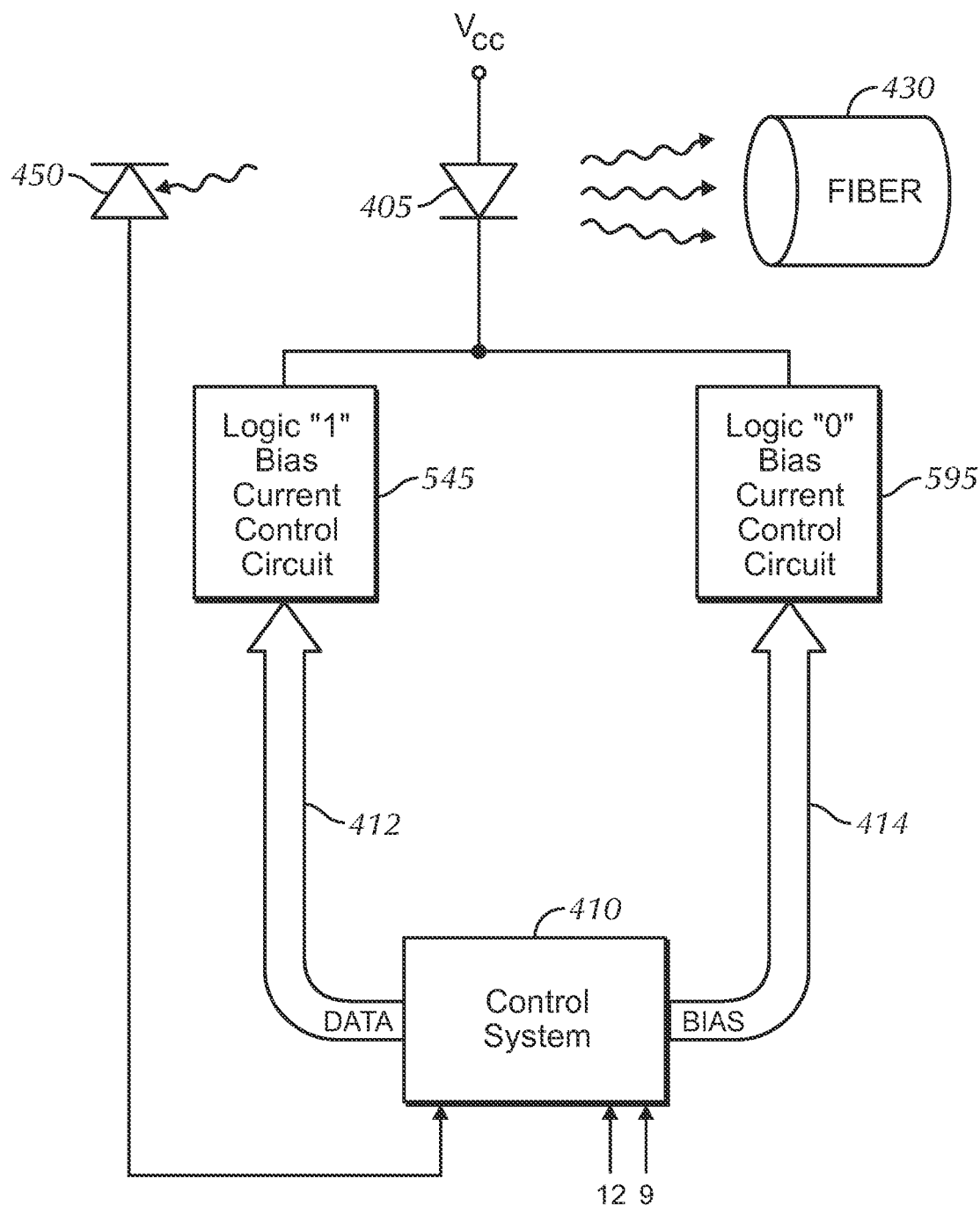
FIG. 3 is a block diagram of one example of a burst mode laser driver.

FIG. 3 is a block diagram of one example of a burst mode laser driver 108. As shown, control system 410 receives the logic zero and one signal inputs from pins 12 and 9 and generates logic zero bias level signal 414 and logic one bias level signal 412 that respectively drive modulation current control circuit 595 and bias current control circuit 545. A combination of these circuits, which may include software, processor devices, memory devices and related circuitry, can be used to control the light output generated by the burst mode laser diode 405, which is located in TOSA 104. Representative examples of the bias current control circuit 595 and the drive modulation current control circuit 545 are shown, for instance, in U.S. Pat. No. 6,738,401, which is hereby incorporated by reference in its entirety. The light output generated by diode 405 can be coupled to a fiber 430 for transmission over an optical communications system. The laser driver 108 also includes a power control loop to maintain the average power level generated by the burst mode laser diode 405. The power control loop includes a monitoring photodiode 450 that receives light from the back facet of the laser diode 405. The photodiode 450 converts the light into an electrical signal for feedback to the control system 410. The control system 410, in turn, adjusts the logic one bias level signal 412 and the logic zero bias level signal 414 to maintain the average power level generated by the burst mode laser diode 405 at a predefined level.

The power control loop that is employed may be an analog control loop such as an open control loop or a closed control loop. In the case of a closed control loop, either a single or dual closed loop arrangement may be employed. It should be noted that when a power control loop is employed it will generally not be necessary to measure and store the logic zero and one bias levels as well as the corresponding current values generated by the monitor photodiode 450 since the control system 410 will use the current values from the calibrated photodiode 450 to determine the appropriate gain levels needed to achieve the desired optical logic zero and one levels generated by the laser diode 405. However, if desired, the logic zero and one bias levels that give rise to optical signals with the desired logic zero and one levels may also be measured and stored.

In order to avoid the use of a DCA to calibrate the monitor photodiode 450 and possibly establish the logic zero and one bias level signals 414 and 412 supplied by the burst mode laser driver 108 the optoelectronic transceiver 100 is provided with power control loop enable and disable pins 8 and 10, respectively. When the power control loop enable is active, the power control loop in laser driver 108 is active. Conversely, when the power control loop disable is active, the power control loop in laser driver 108 is inactive. When the power control loop in the laser driver 108 is inactive, the logic zero and one bias level signals will be applied to the laser diode 405 with no attempt by the control system 410 to maintain the average output power from the laser diode 405.

The current generated by the monitor photodiode 450 can be calibrated and the bias levels of the burst mode laser diode 405 can be established when the power control loop disable is active so that the average output power from the laser diode 405 can fluctuate in accordance with the signal inputs received on pins 9 and 12. In particular, with the power control loop disabled, a series of logic zero levels are applied to the pin 9 while adjusting the logic zero bias level applied to the burst mode laser diode 405 by the control system 410. At the same time a simple DC optical power meter is used to measure the logic zero level of the optical signal that is in turn generated by the burst mode laser diode 405. A very accurate measurement of the zero logic level of the optical signal can be obtained in this way for at least a couple of reasons. First, the measurement can be performed slowly over many successive logic zero bits. Second, the gain of a typical DC optical power meter can be adjusted over a wide range, typically multiple orders of magnitude, so that the most appropriate gain setting can be chosen based on the magnitude of the zero logic level of the optical signal to obtain a good signal to noise ratio.

The aforementioned measurement of the zero logic level of the optical signal cannot be performed if the control loop is enabled because if a string of logic zeros is sent to the laser diode 405, the power control loop will raise the bias levels to get the average power level back up to its predefined level. In other words, the power control loop will in affect fight the very calibration measurement that is to be performed. Accordingly, this technique for measuring the logic zero power level can only be performed when the optoelectronic transceiver 100 offers the capability to disable the power control loop.

A DCA cannot be used to make such an accurate measurement of the logic zero level of the optical signal because the DCA is measuring the eye diagram and the extinction ratio of the optical data signal. The eye diagram corresponds to a superposition of samples of a data signal over a unit time interval of the data signal (i.e., the shortest time period over which the data signal can change state). The eye diagram may be generated by applying the serial data signal to the vertical input of the DCA and triggering a horizontal sweep across the unit time interval based on the data rate of the data signal. When the data signal corresponds to a pseudorandom set of logic one and zeros, the superimposed samples appear on the DCA display as an eye diagram with an eye opening bounded by two transition regions. Thus, when obtaining the eye diagram both the logic zero and logic one measurements are being performed at the same time. Moreover, the measurements are being performed very rapidly since individual data samples or bits are being measured.

It is particularly difficult if not impossible to measure both the logic zero and the logic one levels of the optical signal at the same time with a DCA when high extinction ratios are involved because the two logic levels are many orders of magnitude apart from one another. For instance, for an optical burst signal having an average power level of 2 dBm and an extinction ratio of 25 dB, the logic one power level is about 3.5 milliwatts and the logic zero power level is about 10 microwatts. If the DCA can measure each optical power level to an accuracy of say, 10 microwatts, then the measurement error is negligible for the logic one power level and 100% for the logic zero power level. Since the extinction ratio is defined as the logarithm of the ratio between the logic one optical power level and the logic zero optical power level, the measurement error of the logic zero power level can cause an enormous error in the measurement of the extinction ratio when using a DCA. As previously mentioned, however, the gain of an optical DC power meter can be adjusted so that optical signals that are even separated by multiple orders of magnitude can be accurately measured with a high signal to noise ratio. Thus, while a DCA may be adequate to calibrate a monitor photodiode used in connection with a continuous mode laser diode in which lower extinction ratios are involved, it is generally not adequate to calibrate a monitor photodiode used in connection with a burst mode laser diode, which often involves much higher extinction ratios.

After measuring and recording the value of the monitor photodiode current generated when a logic zero optical signal is output by the burst mode laser diode 405 in the manner described above, the value of the monitor photodiode 450 generated when a logic one optical signal is output from the laser diode 405 can be measured and recorded. This is accomplished while the power control loop remains disabled by applying a series of logic one levels to the pin 9. The DC optical power meter is used to measure the logic one level of the optical signal generated by the burst mode laser diode 405 and, once the desired value is obtained the value of the monitor photodiode current being generated is measured and stored in memory. In this way the monitor photodiode current is calibrated with the logic zero and logic one optical signals produced by the laser diode.

The calibrated values of the current generated by the monitor photodiode 450 for a logic one and logic zero optical signal can be stored in the control system 410 of the laser driver 108 for subsequent use by the power control loop. After the calibration process is complete, the power control loop may be enabled via pin 8 so that the optoelectronic transceiver module is returned to its normal operational state.

Figure 4:
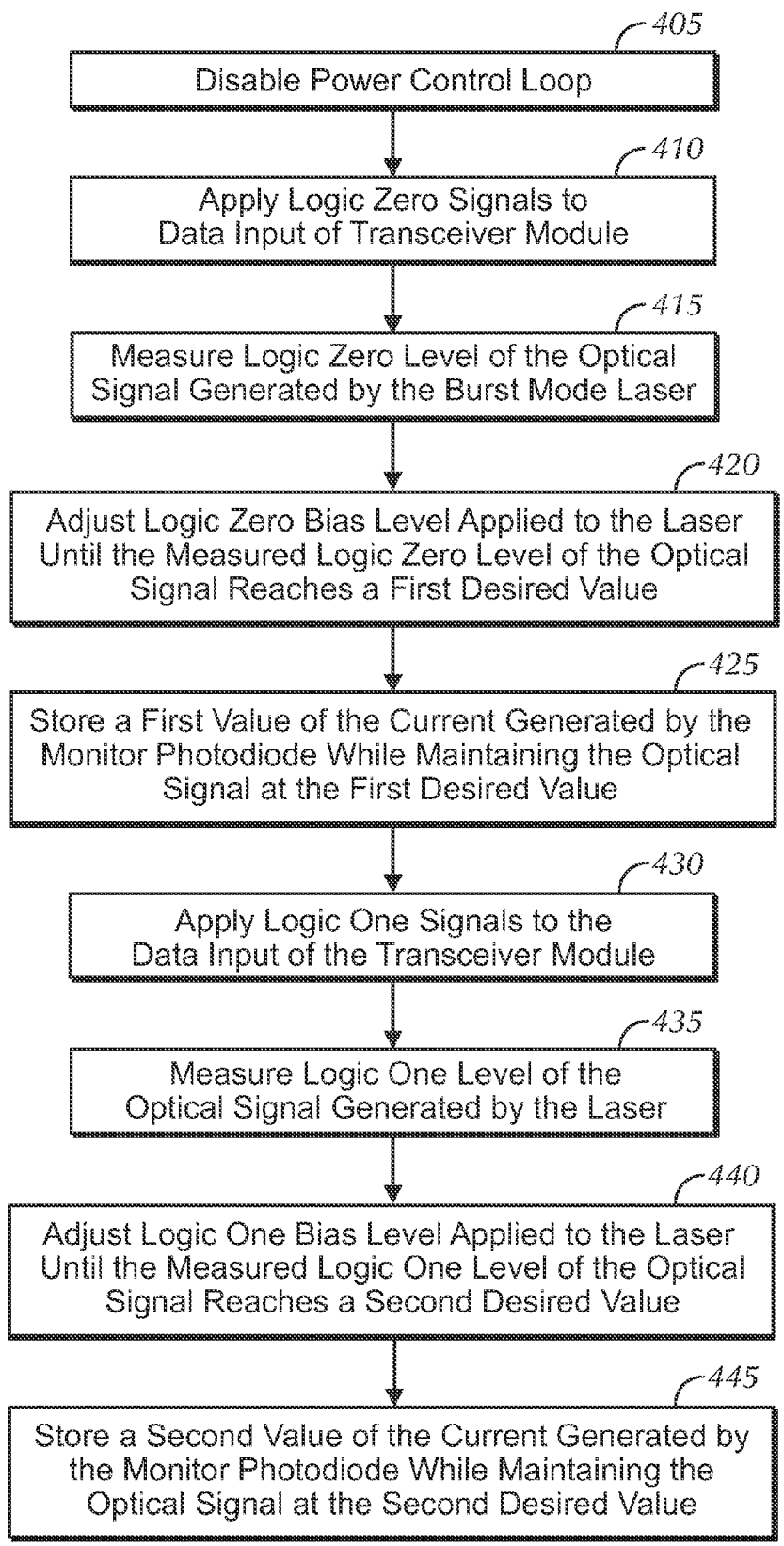
FIG. 4 shows one example of a method that may be employed to calibrate a monitor photodiode that measures the optical output power generated by an optoelectronic transceiver module that includes a burst mode laser diode.

FIG. 4 shows one example of a method that may be employed to calibrate a monitor photodiode that measures the optical output power generated by an optoelectronic transceiver module that includes a burst mode laser diode. The method begins in step 405 by disabling the power control loop that controls an average optical output power generated by the laser diode during a laser burst. A series of logic zero signals are applied to a data input of the transceiver module in step 410 and the logic zero level of the optical signal generated by the burst mode laser diode while applying the series of logic zero signals is measured in step 415. Next, in step 420, the logic zero bias level applied to the laser diode is adjusted until the measured logic zero level of the optical signal reaches a first desired value. While maintaining the optical signal at the first desired value, a first value of a current generated by the monitor photodiode in response to optical energy received from a back facet of the laser diode is stored in step 425. The first value of the current represents the calibrated value of the monitor current that will be measured when the laser generates a proper logic zero optical signal.

The method continues in step 430 by applying a series of logic one signals to the data input of the transceiver module while the power control loop is disabled. A logic one level of the optical signal generated by the burst mode laser diode is measured in step 435 while applying the series of logic one signals. A logic one bias level applied to the laser diode is adjusted in step 440 until the measured logic one level of the optical signal reaches a second desired value. While maintaining the optical signal at the second desired value, a second value of the current generated by the monitor photodiode is stored in step 445 in response to the optical energy received from the back facet of the laser diode. The second value of the current represents the calibrated value of the monitor current that will be measured when the laser generates a proper logic one optical signal.

The processes described above, including but not limited to those performed by the controller 110, may be implemented in general, multi-purpose or single purpose processors. Such a processor will execute instructions, either at the assembly, compiled or machine-level, to perform that process. Those instructions can be written by one of ordinary skill in the art following the description of presented above and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized wireline or wireless transmission signals.

A method and apparatus have been described for calibrating the monitor photodiode used to measure the optical output power generated by an optoelectronic transceiver module that includes a burst mode laser diode. The calibration process is performed by measuring and storing in memory the values of the current generated by the monitor photodiode while the burst mode laser diode is outputting the desired logic one optical signal and while it is outputting the desired logic zero optical signal. The measurements are performed while the power control loop controlling the average optical output power generated by the laser diode is disabled. The optical signal levels generated by the laser diode are advantageously measured with a digital power meter.

The invention claimed is:

1. A method of calibrating a monitor photodiode that measures an optical output power generated by an optoelectronic transceiver module that includes a burst mode laser diode, comprising:
    disabling a power control loop that controls an average optical output power generated by the laser diode during a laser burst;
    applying a series of logic zero signals to a data input of the transceiver module;
    measuring a logic zero level of an optical signal generated by the burst mode laser diode while applying the series of logic zero signals;
    adjusting a logic zero bias level applied to the laser diode until the measured logic zero level of the optical signal reaches a first predetermined value; and
    storing a first value of a current generated by the monitor photodiode in response to optical energy received from a back facet of the laser diode while the optical signal is maintained at the first predetermined value.

2. The method of claim 1 further comprising:
    applying a series of logic one signals to the data input of the transceiver module while the power control loop is disabled;
    measuring a logic one level of the optical signal generated by the burst mode laser diode while applying the series of logic one signals;
    adjusting a logic one bias level applied to the laser diode until the measured logic one level of the optical signal reaches a second predetermined value; and
    storing a second value of the current generated by the monitor photodiode in response to the optical energy received from the back facet of the laser diode while the optical signal is maintained at the second predetermined value.

3. The method of claim 2 wherein the logic zero and logic one levels of the optical signal are measured with a DC power meter.

4. The method of claim 1 wherein the burst mode laser diode has an extinction ratio greater than 17 dB.

5. The method of claim 1 wherein the burst mode laser diode has an extinction ratio of about 25 dB.

6. The method of claim 2 further comprising enabling the power control loop after storing the first and second values of the current generated by the monitor photodiode.

7. A computer-readable storage medium containing instructions which, when performed by one or more processors disposed in an electronic device, performs a method comprising:
  causing to be disabled a power control loop that controls an average optical output power generated by a laser diode during a laser burst;
  receiving from a data input of a transceiver module in which the laser diode is incorporated a series of logic zero or logic one signals; and
  storing values of a current generated by a monitor photodiode in response to optical energy received from a back facet of the laser diode while the laser diode outputs an optical signal at a predetermined logic zero level or a logic one level.

8. The computer-readable storage medium of claim 7 further comprising, in response to the signals received by the data input, adjusting a bias level applied to the laser diode in response to the series of logic zero or logic one signals.

9. The computer-readable storage medium of claim 8 wherein the bias level is adjusted to a first bias value at which the optical output power generated by the laser diode reaches the predetermined logic zero level.

10. The computer-readable storage medium of claim 9 wherein the bias level is further adjusted to a second bias value at which the optical output power generated by the laser diode reaches the predetermined logic one level.

11. The computer-readable storage medium of claim 10 wherein the first and second bias levels result in a laser diode extinction ratio greater than 17 dB.

12. The computer-readable storage medium of claim 7 wherein the power control loop is caused to be disabled upon receipt of a user input requesting activation of a calibration mode of operation.

* * * * *